United States Patent
Kristani

(10) Patent No.: US 9,091,201 B1
(45) Date of Patent: Jul. 28, 2015

(54) TWO-CYCLE INTERNAL COMBUSTION ENGINE WITH PRE-STAGE COOLED COMPRESSION

(71) Applicant: Filip Kristani, Maywood, NJ (US)

(72) Inventor: Filip Kristani, Maywood, NJ (US)

(*) Notice: Subject to any disclaimer, the term of this patent is extended or adjusted under 35 U.S.C. 154(b) by 0 days.

(21) Appl. No.: 14/285,169

(22) Filed: May 22, 2014

Related U.S. Application Data

(63) Continuation-in-part of application No. 14/200,234, filed on Mar. 7, 2014, now abandoned.

(51) Int. Cl.
*F02B 25/00* (2006.01)
*F02B 33/06* (2006.01)

(52) U.S. Cl.
CPC .................................. *F02B 33/06* (2013.01)

(58) Field of Classification Search
CPC .......... F02B 33/02; F02B 33/06; F02B 33/10; F02B 33/18; F02B 33/20; F02B 33/22; F02B 33/44; F02B 33/443; F02B 57/06; F02B 2075/025; F02B 29/0493; F02B 29/06
USPC ............. 123/70 R, 71 R, 72, 66, 67, 68, 69 R
See application file for complete search history.

(56) References Cited

U.S. PATENT DOCUMENTS

| | | | |
|---|---|---|---|
| 2,594,845 A * | 4/1952 | Baumann | .......................... 60/609 |
| 3,765,180 A | 10/1973 | Brown | |
| 4,169,434 A | 10/1979 | Guenther | |
| 4,671,226 A | 6/1987 | van Rinsum | |
| 4,962,645 A | 10/1990 | Morgan | |
| 5,086,746 A | 2/1992 | Albertson | |
| 5,150,692 A | 9/1992 | Trombley et al. | |

* cited by examiner

*Primary Examiner* — Hung Q Nguyen
(74) *Attorney, Agent, or Firm* — Thomas J. Germinario

(57) ABSTRACT

A "two-cycle" internal combustion engine has a single or multi-stage pre-cooled compression, which allows the temperature and pressure of intake air to the combustion cylinders to be tightly controlled, so that a much higher compression ratio and pre-ignition compression pressure can be achieved without approaching the auto-ignition threshold. Because this design can effectively regulate and set the maximum pre-ignition temperature of the fuel-air mixture, it can combust virtually any type of liquid hydrocarbon fuel without knocking. This "two-cycle" engine, due to its higher compression ratio, generates power equivalent to or greater than a four-cycle "CWPSC" engine in a smaller and lighter engine and at the same or higher efficiency.

6 Claims, 5 Drawing Sheets

TWO-CYCLE INTERNAL COMBUSTION ENGINE WITH PRE-STAGE COOLED COMPRESSION

REFERENCE TO RELATED APPLICATIONS

This application is a continuation-in-part of application Ser. No. 14/200,234, filed Mar. 7, 2014.

FIELD OF INVENTION

The present invention relates to the field of internal combustion engines, and more particularly to the field of "two-cycle" Spark Ignition-Internal Combustion Engines (SI-ICE).

BACKGROUND OF THE INVENTION

The efficiency of the four cycle gasoline (petrol) combustion engine with pre-stage cooled compression engine, the "CWPSC" engine, as disclosed and described in detail in application Ser. No. 14/279,580 (incorporated herein by reference), can be improved and increased by using and implementing the concept of a "two-cycle" "CWPSC" engine. This engine would be smaller, more compact and more efficient than its counterpart four-cycle due to a smaller volume, less crankshaft rotation/cycle and therefore less friction forces and energy losses in the walls of the engine cylinder. All benefits of a four cycle "CWPSC" engine apply to this application.

SUMMARY OF THE INVENTION

The "two-cycle" gasoline "CWPSC" internal combustion engine has all four conventional cycles, an intake cycle, a compression cycle, an expansion cycle, and an exhaust cycle similar to four-cycle "CWPSC". The difference is that in a four-cycle "CWPSC" engine, these cycles are accomplished within 2 full rotations of the crankshaft, while in the "two-cycle" engine all these 4 cycles are accomplished within 1 full rotation of the crankshaft. The design value of compression ratio CR for this exemplary "two-cycle" engine is selected to be 24, CR=24. Therefore, the expansion cycle is accomplished from 0° to 166° of the crankshaft rotation, at which point the exhaust valves will open and the expansion process will end. The exhaust cycle is accomplished from 166° to 281° (may vary slightly in this case and it is function of CR value and therefore engine's parameters chosen) of the crankshaft rotation. At that point, the intake process is already in progress, due to the intake valves, which would have previously been open (a few degrees earlier or at 276° which may vary slightly, a function of engine's parameters chosen), and subsequently the exhaust valves will close at 281° rotation position of crankshaft. The intake cycle is accomplished from 276° to 294° of the crankshaft rotation (may vary slightly, a function of CR and therefore engine's parameters chosen as well) at which point the intake valves will be closed.

The intake on this engine is a form of a forced intake process, because it is not an intake by means of vacuum created by an engine piston moving downward toward its BDC as in standard combustion engines. The piston in this engine is moving upward toward TDC of the cylinder during engine's intake process, at which state the remaining exhaust gas has a pressure that is near atmospheric pressure, which is lower than compressed intake air waiting to enter engine's cylinder. The compressed high pressure air is then forced into the engine cylinder as most of the exhaust gases have already escaped the engine cylinder due to its previously occurred exhaust cycle, and the remaining exhaust gas pressure is near the atmospheric pressure, while the intake air pressure is at a much higher pressure. Because of the overlap of opening of intake valves and closing exhaust valves which occurs between 276° and 281° (may vary slightly), the high pressure intake air will expel some of the remaining exhaust gas out of engine cylinder as well, to a degree that depends on the overlap. As the intake valves have closed, which happens at about 294° of the crankshaft rotation or about ⅔ of the piston upward movement into the cylinder from BDC to TDC, only about ⅓ of original cylinder volume is remaining for the piston to travel. The piston continues moving upward and compresses the air-fuel mixture to its pre-ignition compression pressure. The compression cycle is therefore accomplished from 294° to 360° or 0° of the crankshaft rotation position (may vary slightly, a function of CR value and therefore engine's parameters chosen also). The compression cycle is developed this way as a continuation of the compression process, which has previously occurred at the compressor unit and was then interrupted by the heat-exchange unit, where the compressed air is cooled in between the compression processes. The end of compression cycle culminates in spark ignition of the air-fuel mixture, which drives the piston downward in the expansion cycle explained above.

The volume of the compressor cylinder on this type of engine with pre-cooled compression is equal to the size of the engine cylinder. As an example the volume of the engine cylinder $V_e$ is selected to be ½ Liter for this exemplary engine. The size of the compressor cylinder volume $V_a$ therefore is selected to be ½ Liters as well, $V_e = V_a$. For the purpose of simplified comparison with the four-cycle "CWPSC" engine, we will consider this "two-cycle" engine's work for its 2 full engine combustion cycles or 2 crankshaft full rotations, and thus will treat the engine cylinder volume $V_e$ and its compressor volume $V_a$ as effectively equal to twice their size, or 1 Liter. As it is clarified by the above explanation, this "two-cycle" "CWPSC" engine is half the size of a standard four-cycle "CWPSC" engine for the same work power output. The intake volume $V_t$ is selected to be only about 0.3 size of the engine volume $V_e$, $V_t = 0.3 V_e$, based on the "two-cycle" exemplary engine discussed above. Therefore, the air will be compressed by the compressor, since less volume is available at the engine intake. By applying the adiabatic gas process formula, where $P(V)^\gamma = $Constant (with an air compression $\gamma$ coefficient of 1.3) the compressor will compress air at pressure $P_c$:

$$P_a(V_a)^{1.3} = P_c(V_c)^{1.3}$$

$$(1)(1)^{1.3} = P_c(0.3)^{1.3}$$

$$P_c = 4.78 \text{ bars}$$

Applying the Combined Gas Law, the temperature $T_c$ of this compressed air can be calculated as follows:

$$P_a V_a / T_a = P_c V_c / T_c$$

$$(1)(1)/300 = (4.78)(0.3)/T_c$$

$$T_c = 430° \text{ K} = 157° \text{ C}.$$

By applying Combined Gas Law and cooling the compressed air at a constant 318° K, then the intake pressure $P_t$ will drop, and it is calculated as follows:

$$P_c V_c / T_c = P_t V_t / T_t$$

$$(4.78)(0.3)/430 = P_t(0.3)/318°$$

$$P_t = 3.53 \text{ Bars}.$$

This pressurized air and then air/fuel mixture will enter the engine during a short intake cycle of 0.3 the size of the engine cylinder volume $V_e$, from 276° to 294° as explained above, during which time the intake valves are kept open, and enter the engine cylinder at high velocity and push the remaining exhaust gasses out as exhaust valves are about to close at 281° of crankshaft rotation position. We will consider this process to be an isobaric process since the intake volume of engine cylinder equal to $V_t$=0.3 Liters is much smaller than all reservoirs plus air cooling radiator volumes, and the compressor keeps meanwhile compressing the air. The temperature of the intake air $T_t$ will be always 318° K (45° C.) regardless of the ambient temperature at the time. At the end of the intake cycle, which is at 294° position of the crankshaft position, the air/fuel mixture inside the engine cylinder will have a 3.53 Bars pressure at 27° C., for example in this selected engine, and a temperature of about 318° K, a constant value, inside the engine cylinder.

As the cylinder moves upward toward top dead center (TDC) toward to 360° or 0°, the air/fuel mixture volume will compress and the pressure $P_i$ at the combustion chamber, with designed CR=24 just before ignition at TDC. For a compressed chamber volume of $V_i$=1 Liter/24=0.042 Liters and intake volume $V_t$=0.3 Liters, pre-ignition pressure of the compressed mixture $P_i$ will be calculated by the adiabatic gas process formula as follows:

$$P_t(V_t)^{1.3} = P_i(V_i)^{1.3}$$

$$(3.53)(0.3)^{1.3} = P_i(0.042)^{1.3}$$

$$P_i = 45.48 \text{ Bars}$$

The temperature $T_i$ of the pre-combustion compressed air/fuel mixture, by applying the Combined Gas Law, would be calculated as follows at TDC:

$$P_t V_t / T_e = P_i V_i / T_i$$

$$(3.53)(0.3)/318 = (45.48)(0.042)/T_i$$

$$T_i = 574° \text{ K} = 301° \text{ C}.$$

This engine would work then with CR=24 and a pre-ignition air mixture pressure of about 46 Bars at an ambient temperature of 27° C. The pre-ignition temperature of the compressed air mixture is thus a constant 301° C., regardless of ambient temperature, which is lower than that of standard SI engine as the above calculations show (which is 314° C. as is described in the detailed comparison of the "CWPSC" four-cycle engine in application Ser. No. 14/279,580). This concept can be applied for any desired pre-ignition temperature, allowing us to build this way any engine, which can burn any fuel, building thus a multi-fuel engine without any loss in the efficiency of the engine.

If we assume that the energy spent on burning fuel mixture inside the combustion chamber is in such quantity that it will increase the temperature and therefore the gas pressure $P_f$ by about 2.5 times, and by assuming that the volume of combustion chamber $V_i$ does not change during the ignition, then temperature $T_f$ is calculated by the Combined Gas Law formula as follows:

$$P_i V_i / T_i = P_f V_f / T_f$$

$$(45.48)(0.042)/574 = (113.7)(0.042)/T_f$$

$$T_f = 1,435° \text{ K}$$

Where, $P_f$—is gas pressure after the burning process 2.5 times higher than Pi, $V_f$—is engine volume after the burning process, and $T_f$—is the gas temperature after burning. If we consider also that the burning process happens so rapidly that the engine combustion volume does not change during the ignition process, then $V_f = V_i = 0.042$ Liters.

Let's consider the expansion process which is in fact the work process in this engine. By applying the adiabatic gas process formula, with an air compression coefficient of 1.3, we can calculate the exhaust gas pressure $P_x$:

$$P_f(V_f)^{1.3} = P_x(V_e)^{1.3}$$

$$(113.7)(0.042)^{1.3} = P_x(0.985)^{1.3}$$

$$P_x = 1.88 \text{ Bars}$$

Since the expansion cycle ends at about 166° of crankshaft rotation position, $V_e$, which is the volume of cylinder engine in the expansion cycle, is a little smaller than 1 Liter and it is 0.985 liters.

By applying the combined Gas Law formula just right before the exhaust process, we can calculate the exhaust gas temperature $T_x$:

$$P_f V_f / T_f = P_x V_e / T_x$$

$$(113.7)(0.042)/1,435 = (1.88)(0.985)/T_x$$

$$T_x = 556° \text{ K}$$

Therefore the engine with "two-cycle" pre-stage compression will have an exhaust gas pressure $P_x$=1.88 Bars and an exhaust gas temperature $T_x$=556° K.

FIGS. 3A and 3B represents the work P-V diagram for 2 cycle of a CWPSC "Two-Cycle" 0.5 Liter (2*½=1 Liter) size engine with a compression ratio CR=24, for the purpose of comparison with a four-cycle CWPSC engine, where:

a—work spent by the engine on compression=1.96 PV/2 cycle, b—work gained by engine on expansion=8.17 PV/2 cycle, c—work that can not be captured on exhaust and is lost=1.06 PV/2 cycle, d—heat applied to the engine by burning fuel which increases the pressure by 2.5 times, e—work balance gained by engine=4.48 PV/2 cycle, f—work spent on compressor=1.09 PV/2 cycle, g—work lost in pre-intake air cooling=0.635 PV/2 cycle.

Simplified efficiency of this engine is: E=4.48/5.54=81%. The efficiency of this engine is higher that the efficiency of a four-cycle CWPSC engine "Version I" due to one less rotation of the crankshaft per full engine cycle and therefore less friction forces inside the engine. This engine will also run quieter and smother than four-cycle CWPSC engine because the power stroke will develop per each crankshaft rotation rather than every two rotations. This simplified formula of calculated efficiency does not take into consideration loses occurring from friction, heat lost in the engine, and the exhaust gas heat temperature after it has reached atmospheric pressure of 1 Bar.

DETAILED DESCRIPTION OF THE PREFERRED EMBODIMENT

Figure 1:
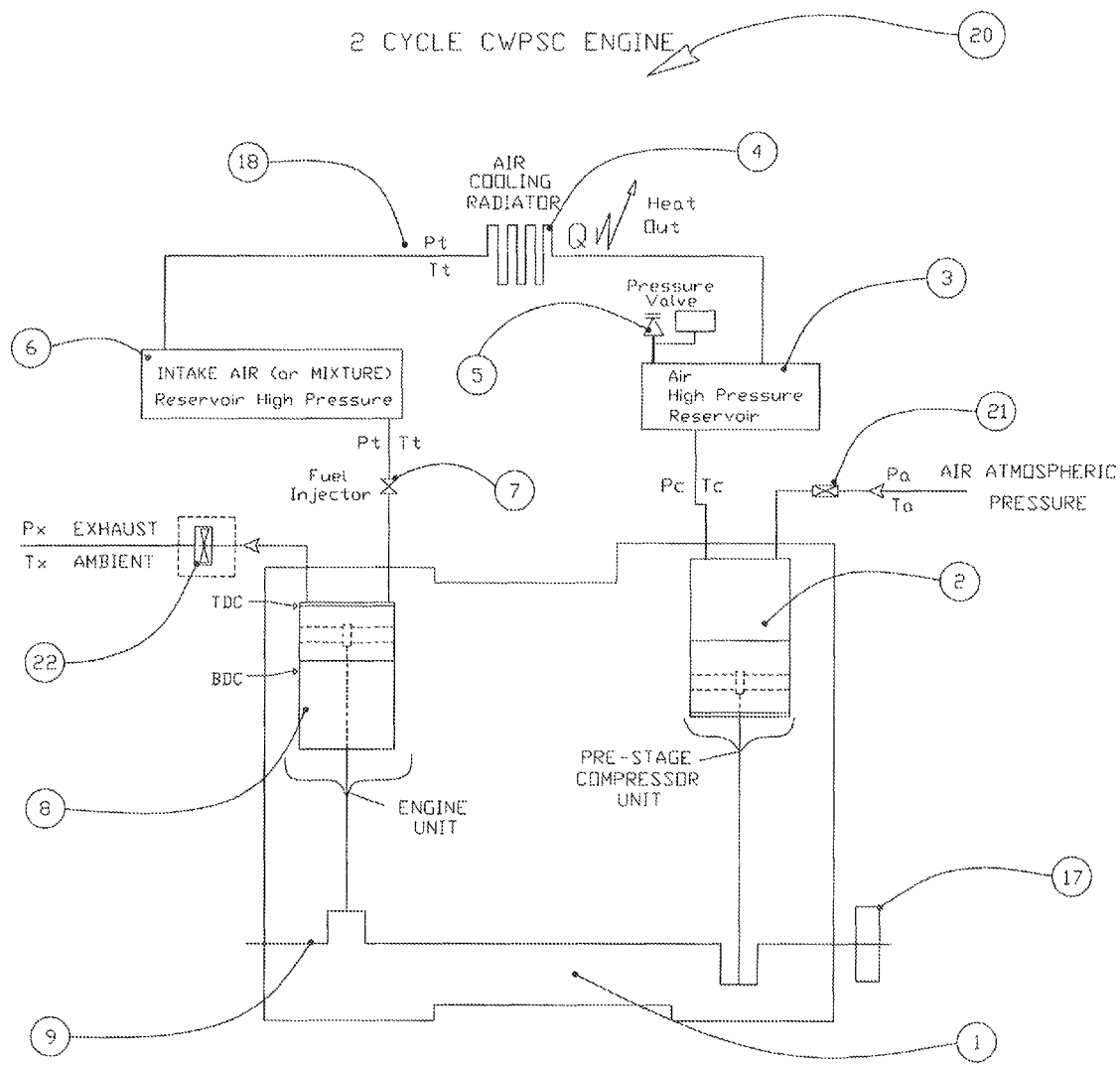
FIG. 1 is a schematic diagram illustrating the "two-cycle" combustion process of the present invention with one stage pre-cooled compression.

Referring to FIG. 1, it schematically depicts a first embodiment of an exemplary single-cylinder "two-cycle" internal combustion engine with pre-cooled compression 20. The engine block 1, comprises a pre-stage compressor cylinder 2, a combustion cylinder 8, and an air-cooled heat-exchanger 4. In this embodiment, the combustion cylinder 8 and the compressor 2 are connected to the same crankshaft 9 and flywheel 17. Due to the four-cycle engine combustion process 19 of this "two-cycle" engine, the compressor 2 will complete one compression cycle for each complete engine combustion cycle. Therefore, the engine cylinder 8 and the compressor cylinder 2 should be equal size. Therefore, during each combustion cycle, the compressor 2 will intake and compress a volume of air equal to engine's cylinder volume. Atmospheric air is compressed at the compressor 2 cylinder volume. The air is compressed, despite the fact that engine cylinder is equal to compressor cylinder size, because only ⅓ of the engine cylinder volume is available at the intake cycle process to accept air/fuel mixture for this exemplary embodiment. After the air is compressed it passes from the air tank reservoir 3, which has a pressure control valve 5, through a heat-exchange unit without volume expansion at which point it is cooled to approximately 318° K by a cooling fan at the air cooling radiator 4. After the compressed air passes the air cooling radiator 4, at which point the compressed air has reached the target intake pressure $P_t$=3.53 Bars and temperature 318° K for this exemplary embodiment, it enters the reservoir 6 pressurized container ready to enter the engine cylinder 8 on its intake process cycle. An optional exhaust fan 22 will help clear the exhaust system for remaining exhaust gases.

Because the intake in this two-cycle engine is a form of a forced intake process as described above, a separate small electric compressor and a fast acting standby high pressure air reservoir may be required to pre-pressurize the air reservoirs and eliminate the pressure lag so to start this engine (not shown).

Figure 2:
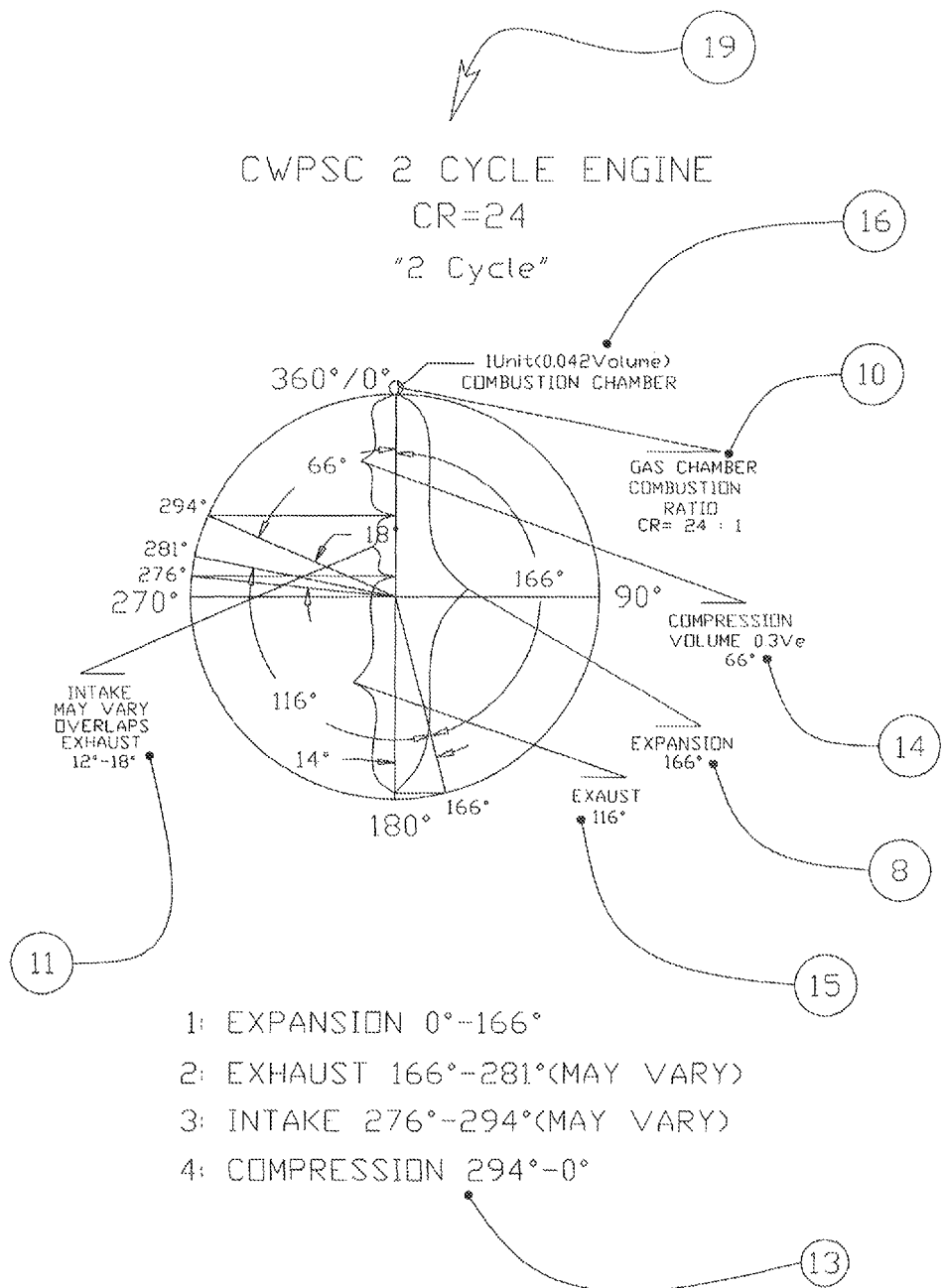
FIG. 2 is a schematic diagram which illustrates the "two-cycle" combustion process of the present invention and shows in detail exemplary angle portions of crankshaft rotation for each cycle in the engine.

FIG. 2, an exemplary four-cycle, of this "two-cycle" single cylinder engine combustion process 19 comprises a short intake 11 process which is accomplished from 276° to 294° (may vary slightly) of the crankshaft rotation, compression cycle 14 which is accomplished from 294° to approximately 360° or 0° (may vary slightly), expansion cycle 12 which is accomplished from 0° to 166° (may vary slightly), and the exhaust 15 cycle which is accomplished from 166° to 281° (may vary slightly), with a compression ratio CR 10 of 24:1.

The relative volumes of the compressor cylinder 2 and the combustion cylinder 8 are selected to achieve a designed compressed air pressure. In the exemplary configuration of FIG. 1, the combustion cylinder 8 is ½ Liters and the compressor cylinder 2 size is ½ Liters too. Therefore, for each combustion cycle, the compressor 2 will intake and compress ½ Liter of ambient air. If the ambient air is at a pressure $P_a$ and temperature $T_a$, then the gas laws may be applied to calculate a compressed air pressure $P_c$ of about 4.78 bars and temperature $T_c$ of about 157° C. By increasing the volume of the compressor cylinder 2 relative to the combustion cylinder 8, or by changing the size of the engine compression volume 14, the values of $P_c$ and $T_c$ can be increased to achieve higher design values, as required. In the present design the compression volume 14 is equal to ⅓ of the total engine cylinder 8 volume size.

The compressed air at pressure $P_c$ and temperature $T_c$ is stored in a pre-stage air reservoir 3, which has a regulating pressure valve 5 to maintain the pressure at the design $P_c$. The compressed air from the reservoir 3 is then released, without volume expansion, into the air-cooled heat exchanger 4. The rate of heat exchange in the heat exchanger 18 is controlled by fan speed.

These heat exchange controls can be regulated by a central processing unit (CPU, not shown), based on readings of pressure sensors 5 or the throttle 21 in front of the heat exchanger, to achieve a target combustion cylinder intake temperature $T_t$. The target intake temperature $T_t$ is selected so as to avoid engine knocking at the engine's design compression ratio CR 10, based on the auto-ignition temperature of the fuel. Alternately, the CPU can be programmed to control the rate of heat exchange in order to achieve a variety of combustion cylinder intake temperatures $T_t$, so as to avoid knocking at various adjustable compression ratios and/or fuel auto-ignition temperatures.

Figure 3:
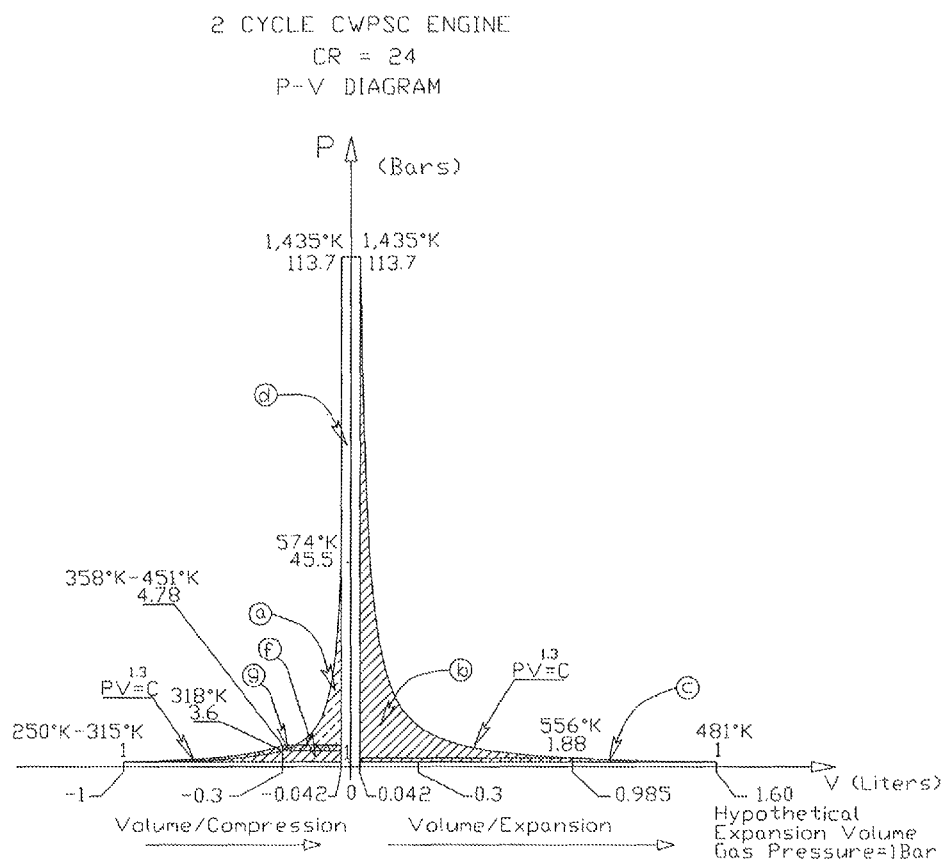
FIGS. 3A and 3B are schematic diagrams illustrating the "two-cycle" combustion process of the present invention with P-V diagrams for work of 2 full rotations of the crankshaft.
Figure 3A:
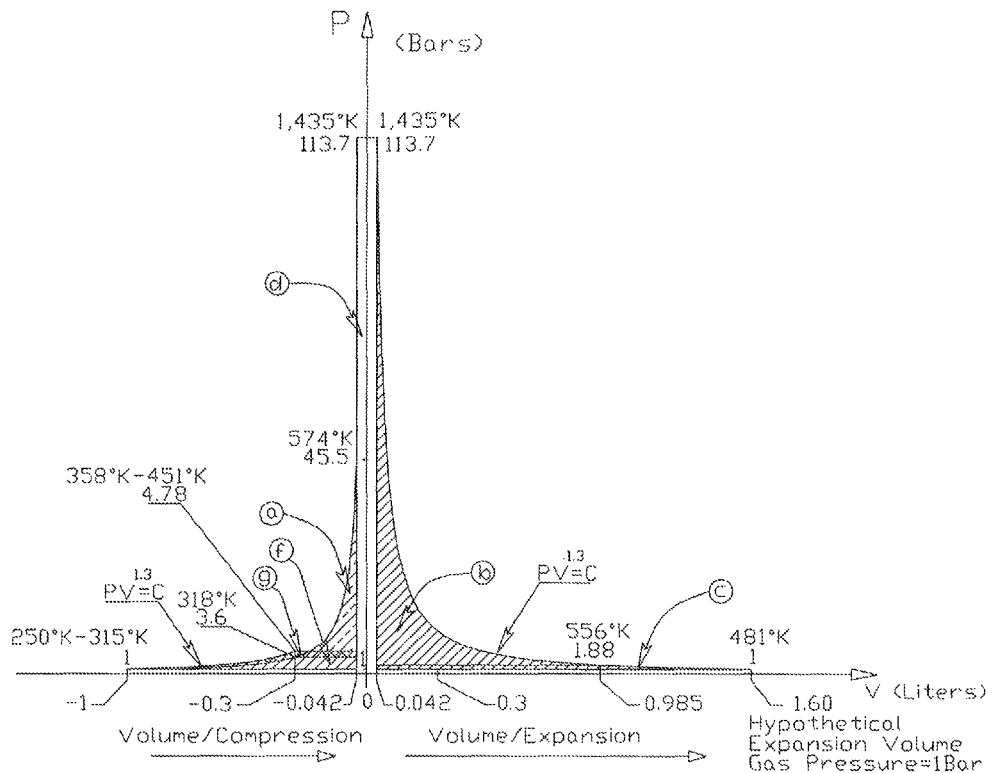
Figure 3B:
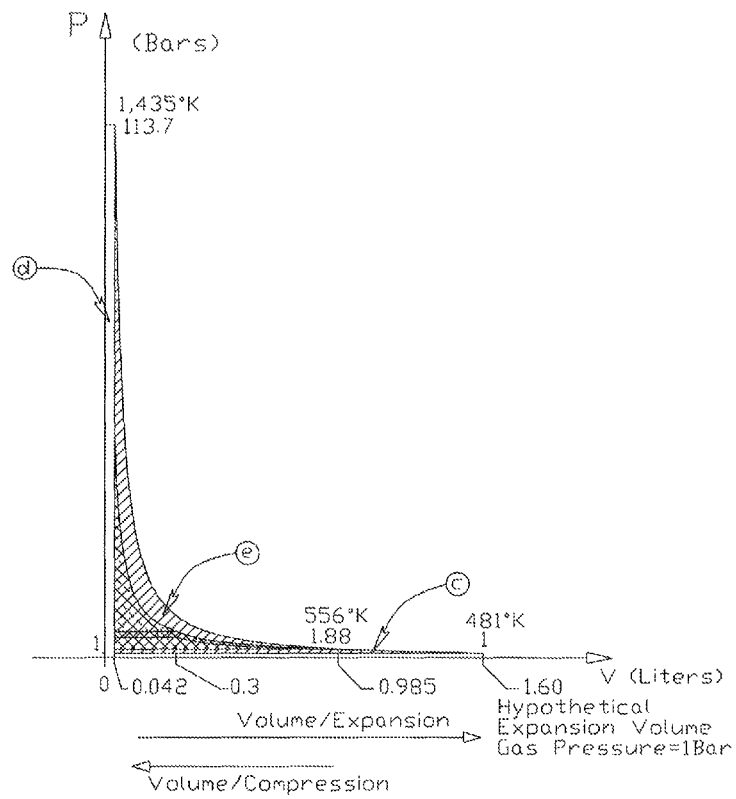

FIG. 3A and FIG. 3B, an exemplary four-cycle, of this "two-cycle" single-cylinder combustion process 23 P-V diagram with a compression ratio CR=24 and volume engine cylinder size $V_e$=½ Liter. Hypothetical expansion engine volume of 1.60 Liters represents a non-existent expansion volume at which point the engine cylinder would has to expand for gas exhaust pressure to equal 1 Bar, and no more work can be extracted, despite what the exhaust temperature $T_{ex}$ value is at that point. This P-V diagram represents the work obtained by 2 full engine cycles or 2 complete rotations of the crankshaft, for a total effective engine volume size equal to 1 Liter, 2*$V_e$=1 Liter.

Calculation of a non-existent engine volume size $V_{ex}$ for the exhaust gas pressure to reach 1 Bar, or atmospheric pressure:

$$P_f(V_f)^{1.3}=P_a(V_{ex})^{1.3}$$

$$(113.7)(0.042)^{1.3}=1(V_{ex})^{1.3}$$

$$V_{ex}=1.60 \text{ Liters}$$

And by applying the combined Gas Law formula just before exhaust process, we can calculate the hypothetical exhaust gas temperature $T_{ex}$ for a non-existent engine volume of 1.60 Liters:

$$P_f V_f/T_f=P_a V_{ex}/T_{ex}$$

$$(113.7)(0.042)/1,435=(1)(1.60)/T_{ex}$$

$$T_{ex}=481° \text{ K}$$

Where, $V_{ex}$—is a hypothetical volume that the engine cylinder would have to expand in order to capture all the work possible, where $P_a$ is the atmospheric pressure.

The simplified efficiency of this engine, which is the ratio of the work gained over the sum of total work gained and the work lost in the hypothetical expansion engine volume of 1.60 Liters, is according to this P-V diagram 81%. This simplified formula of calculated efficiency does not take into consideration the loses occurring from friction, heat lost in the engine and the exhaust gas heat temperature after it has reached atmospheric pressure of 1 Bar a temperature as proven above from the hypothetical engine volume to be 481°

K or 208° C., because that gas cannot perform anymore work despite the heat that it contains.

GLOSSARY

The following glossary provides definitions of terms used herein:

Two-Cycle: refers to an engine that has all 4 cycles, expansion, exhaust, intake and compression in just only one revolution of the engine crankshaft.

SI: spark ignition refers to a combustion event by an electric spark.

ICE: internal combustion engine.

Top Dead Center (TDC): the piston's closest position to cylinder head.

Bottom Dead Center (BDC): the piston's farthest position from cylinder head.

Compression Ratio (CR): ratio of compression cylinder volume at BDC to that at TDC.

CWPSC: combustion with pre-stage compression.

Air/fuel mixture: mixture of air/fuel during engine's intake.

Total cylinder volume: the volume of the cylinder from TDC to BDC.

What is claimed is:

1. A "two-cycle" spark ignition internal combustion engine that has the functionality of a four-cycle combustion engine, comprising:

one or more combustion cylinders, each cylinder having a total cylinder volume, an intake volume, a top dead center (TDC) and a bottom dead center (BDC), and each cylinder having one or more intake valves and one or more exhaust valves, and each cylinder containing an axially reciprocating piston mechanically connected to a crankshaft and a flywheel, wherein the crankshaft, the intake valves and the exhaust valves are configured and controlled so that each cylinder executes a two-cycle combustion process, comprising an expansion cycle, during which the intake valves and the exhaust valves are closed and during which the piston moves through a first crankshaft angle interval axially toward the BDC of the cylinder without reaching the BDC, followed by an exhaust cycle, during which the intake valves remain closed and the exhaust valves are opened and during which the piston continues moving axially toward the BDC until the piston reaches the BDC, and then moves through a second crankshaft angle interval axially toward the TDC of the cylinder and drives a portion of an exhaust gas out of the cylinder, followed by a combined exhaust-intake cycle, during which the intake valves are opened and the exhaust valves remain opened and during which the piston continues moving axially toward the TDC of the cylinder through a third crankshaft angle interval and during which pressurized intake air is forced into the cylinder through the opened intake valves to expel a remainder of the exhaust gas through the opened exhaust valves, followed by an intake cycle, during which the intake valves remain opened and the exhaust valves are closed and during which a pressurized intake volume of an air-fuel mixture is forced into the cylinder through the opened intake valves, while the piston moves axially through a fourth crankshaft angle interval toward the TDC, followed by a compression cycle, during which the intake valves are closed and the exhaust valves remain closed and during which the piston continues to move axially toward the TDC of the cylinder through a fifth crankshaft angle interval and compresses the air-fuel mixture to a pre-ignition compression volume, a pre-ignition compression pressure, and a pre-ignition compression temperature, followed by a spark ignition of the air-fuel mixture, which drives the piston toward the BDC of the cylinder in a next expansion cycle, followed by a next exhaust cycle, and wherein a ratio of the intake volume to the pre-ignition compression volume defines an effective compression ratio;

one or more pre-stage air compressors, each compressor connected to the crankshaft, and each compressor having a compressor air volume, wherein the crankshaft is configured and controlled so that each compressor compresses the compressor air volume of ambient air at an atmospheric pressure and at an ambient air temperature, to generate a pressurized pre-intake air volume having a pre-intake air temperature and a pre-intake air pressure of more than 2.1 Bars;

one or more heat-exchangers, each of which is controlled by a central processing unit (CPU) that is configured and programmed to regulate the heat-exchangers so that the pressurized pre-intake air volume is cooled, without volume expansion, to an intake air pressure of more than 1.8 Bars and an intake air temperature, so as to produce an intake air volume, which is mixed with a fuel that has an auto-ignition temperature, so as to constitute the intake volume of one of the cylinders; and wherein the heat exchangers are regulated by the CPU so that the intake air temperature remains constant, regardless of the ambient air temperature, and so that the intake air temperature is sufficiently low that the pre-ignition compression temperature, at a designated effective compression ratio, is below the auto-ignition temperature of the fuel.

2. The engine of claim 1, wherein the heat exchangers are regulated by the CPU so that the intake air temperature can be adjusted to achieve any one of multiple alternative pre-ignition compression temperatures, and wherein each alternative pre-ignition compression temperature corresponds to one of multiple alternative designated effective compression ratios, or to one of multiple alternative fuel auto ignition temperatures, or to a combination of one of multiple alternative designated effective compression ratios and one of multiple alternative fuel auto-ignition temperatures.

3. The engine of either of claim 1 or 2, wherein each of the pre-stage air compressors comprise a compressor cylinder and a compressor piston, and wherein the compressor cylinder has a total cylinder volume, a TDC and a BDC, and the compressor piston is mechanically connected to the crankshaft and the flywheel, and wherein the crankshaft is configured and controlled so that each of the compressor cylinders executes, concurrently with the two-cycle combustion process, a two-stage compression process, comprising a compressor intake stage, during which the compressor piston moves axially toward the BDC of the compressor cylinder and draws the compressor air volume of ambient air, equal to the total cylinder volume of the compressor cylinder, into the compressor cylinder, followed by a compressor compression stage, during which the compressor piston moves axially toward the TDC of the compressor cylinder and compresses the compressor air volume of ambient air into a pre-intake air reservoir, so as to comprise the pressurized pre-intake air volume.

4. The engine of claim 3, wherein the intake volume of each combustion cylinder is not equal to the total cylinder volume of each of the combustion cylinders.

5. The engine of claim 3, wherein the total cylinder volume of each combustion cylinder is a volume of the cylinder with the piston at BDC, and wherein the combustion chamber volume of each combustion cylinder is a volume of the cylinder with the piston at TDC, and wherein a ratio of the total cylinder volume to the combustion chamber volume defines a nominal compression ratio, and wherein the nominal compression ratio is at least 18, and wherein the first crankshaft angle interval is 0° to approximately 166°, the second crankshaft angle interval is approximately 166° to approximately 276°, the third crankshaft angle interval is approximately 276° to approximately 281°, the fourth crankshaft angle interval is approximately 281° to approximately 294°, and the fifth crankshaft angle interval is approximately 294° to 360°.

6. The engine of claim 4, wherein the total cylinder volume of each combustion cylinder is a volume of the cylinder with the piston at BDC, and wherein the combustion chamber volume of each combustion cylinder is a volume of the cylinder with the piston at TDC, and wherein a ratio of the total cylinder volume to the combustion chamber volume defines a nominal compression ratio, and wherein the nominal compression ratio is at least 18, and wherein the first crankshaft angle interval is 0° to approximately 166°, the second crankshaft angle interval is approximately 166° to approximately 276°, the third crankshaft angle interval is approximately 276° to approximately 281°, the fourth crankshaft angle interval is approximately 281° to approximately 294°, and the fifth crankshaft angle interval is approximately 294° to 360°.

\* \* \* \* \*